US012559619B2

(12) United States Patent　　　(10) Patent No.:　US 12,559,619 B2

Muyldermans et al.　　　　　　　(45) Date of Patent:　　Feb. 24, 2026

(54) STYRENIC BLOCK COPOLYMERS AND METHODS OF PREPARATION THEREOF

(71) Applicant: Kraton Corporation, Houston, TX (US)

(72) Inventors: Xavier D.D.J. Muyldermans, Brussels (BE); Julie Li, Shanghai (CN)

(73) Assignee: Kraton Corporation, The Woodlands, TX (US)

( * ) Notice: Subject to any disclaimer, the term of this patent is extended or adjusted under 35 U.S.C. 154(b) by 562 days.

(21) Appl. No.: 18/172,375

(22) Filed: Feb. 22, 2023

(65) Prior Publication Data

US 2023/0265278 A1　　　Aug. 24, 2023

Related U.S. Application Data

(60) Provisional application No. 63/268,390, filed on Feb. 23, 2022.

(51) Int. Cl.
| | |
|---|---|
| *C08L 53/02* | (2006.01) |
| *C08F 8/04* | (2006.01) |
| *C08F 12/08* | (2006.01) |
| *C08F 36/06* | (2006.01) |

(52) U.S. Cl.
CPC .............. *C08L 53/025* (2013.01); *C08F 8/04* (2013.01); *C08F 12/08* (2013.01); *C08F 36/06* (2013.01); *C08L 2203/16* (2013.01); *C08L 2207/04* (2013.01)

(58) Field of Classification Search
CPC ............. C08L 53/0225; C08L 2203/16; C08L 2207/04; C08L 23/14; C08L 95/00; C08L 53/025; C08F 8/04; C08F 297/04; C08F 297/042; C08F 297/044; C08F 2500/21; C08F 2500/39; C08F 2500/32; C09J 153/025

See application file for complete search history.

(56) References Cited

U.S. PATENT DOCUMENTS

| | | | |
|---|---|---|---|
| 2002/0016381 A1* | 2/2002 | Kroll ...................... | A61L 15/585 522/109 |
| 2007/0225429 A1 | 9/2007 | Wright et al. | |
| 2016/0230000 A1 | 8/2016 | Gu | |
| 2020/0190375 A1* | 6/2020 | Muyldermans | ....... C08L 53/025 |
| 2022/0049083 A1* | 2/2022 | Muyldermans | ...... C08G 65/485 |
| 2022/0298351 A1* | 9/2022 | Muyldermans | ....... C08L 53/025 |

FOREIGN PATENT DOCUMENTS

| | | |
|---|---|---|
| JP | 2012236901 A | 12/2012 |

* cited by examiner

*Primary Examiner* — Mark S Kaucher

(57) ABSTRACT

A hydrogenated styrenic block copolymer (HSBC) is disclosed comprising, prior to hydrogenation, a polymer block A of at least one vinyl aromatic monomer, a polymer block B of at least one conjugated diene, and a copolymer block C of at least one vinyl aromatic monomer and 1,3-butadiene monomer. The HSBC has a total vinyl aromatic content of 15 to 60 wt. % and an aromatic blockiness index of 20 to 80%. The viscoelastic properties of HSBC show a value of a tan δ peak height of 0.7 to 2, a tan δ peak temperature of −40 to 25° C., and a temperature width value (in ° C.) at half the tan δ peak height of 17 to 40. The HSBC provides improved mechanical properties and can be used in preparation of adhesives and protective films applications.

20 Claims, 1 Drawing Sheet

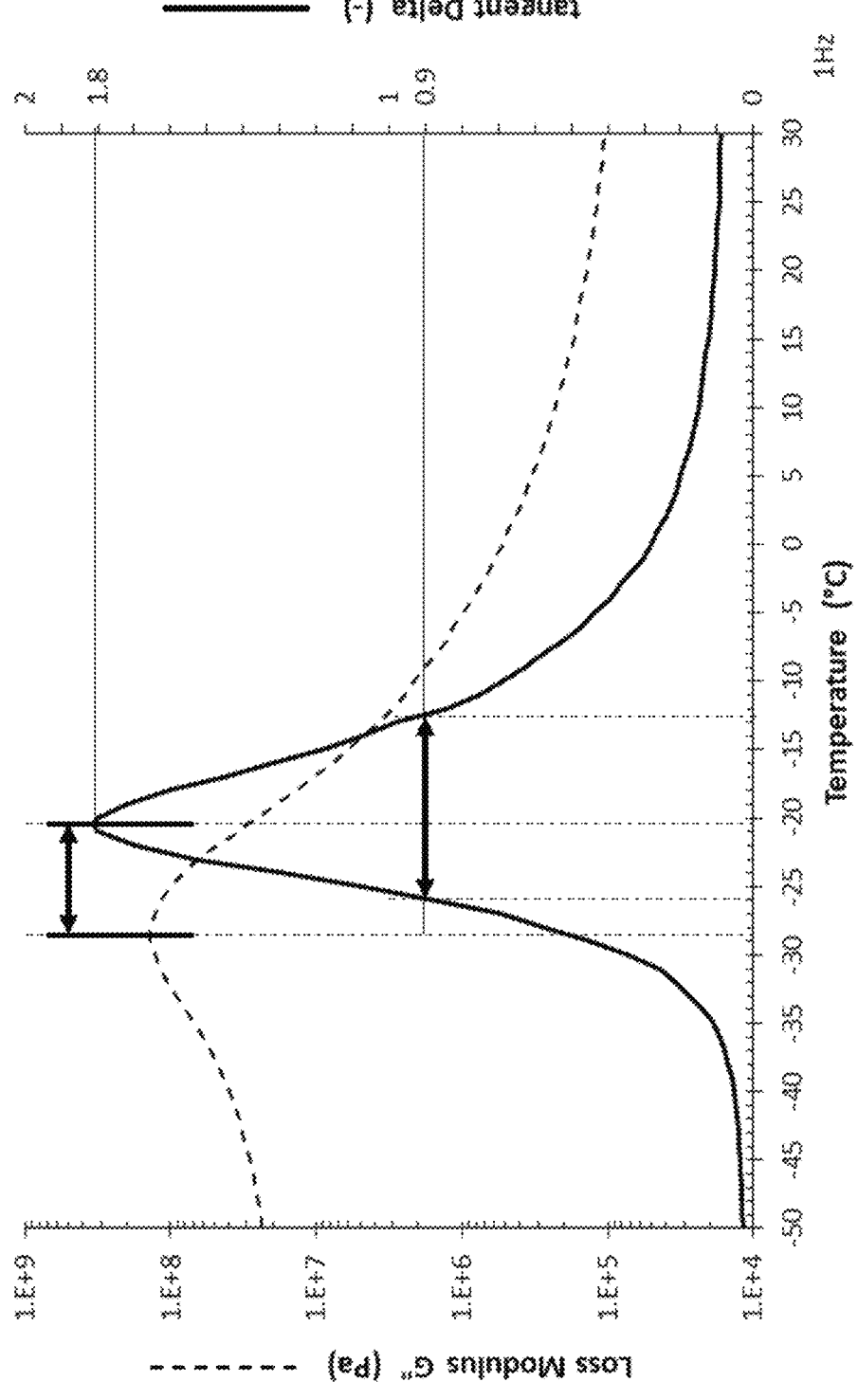

STYRENIC BLOCK COPOLYMERS AND METHODS OF PREPARATION THEREOF

RELATED APPLICATIONS

This application claims benefit to U.S. provisional application No. 63/268,390, filed on Feb. 23, 2022, which is hereby incorporated herein by reference.

FIELD

The present disclosure relates to hydrogenated styrenic block copolymers (HSBCs), methods of preparation, and applications thereof.

BACKGROUND

Styrenic block copolymers (SBCs) containing vinyl aromatic compounds and conjugated dienes, are well known in the art and exhibits elasticity comparable to that of natural and/or synthetic rubber. Moreover, the processability of SBCs at high temperatures can be compared with a thermoplastic resin.

SBCs are used in number of applications including automotive industry, construction, tool manufacture, adhesives, sealants, packaging materials for consumer electrical appliances, etc. For some applications, there is a need for high sound or vibration damping performance over a large range of vibration frequencies and broad temperature ranges. Tan delta (δ) peak is the ratio of the loss to the storage modulus, characterizing the efficiency of the material to dissipate energy when deformed. For some other applications, surface protection films for use in protecting surfaces, e.g., polymers, metals, glass, woods, furniture, fixtures, electrical appliances, etc., from scratches, dirt, and smudges. SBCs for use in such applications, need to have a balance of mechanical properties in terms of strength, suitable modulus or hardness, weatherability, heat resistance, and the like.

There is still a need of a polymer having a combination of broad tan delta (δ) peak and adhesion over a broad temperature range, and with low peel adhesion build-up over time.

SUMMARY

In one aspect, the disclosure relates to a hydrogenated styrenic block copolymer (HSBC) comprising, consisting essentially of, or consists of at least one polymer block A, at least polymer block B, and at least one copolymer block C. Prior to hydrogenation, each polymer block A is derived from a vinyl aromatic monomer, each polymer block B is derived from a conjugated diene monomer selected from the group consisting of isoprene, 1,3-butadiene, 2,3-dimethyl-1,3-butadiene, 1-phenyl-1,3-butadiene, 1,3-pentadiene, 1,3-hexadiene, 3-butyl-1,3-octadiene, farnesene, myrcene, piperylene, cyclohexadiene, and mixtures thereof, and each copolymer block C is derived from at least one vinyl aromatic monomer and 1,3-butadiene monomer. The HSBC has a hydrogenation level in the polymerized conjugated diene monomer in the polymer block B of greater than 90%, a hydrogenation level in the polymerized 1,3-butadiene monomer in the polymer block C of greater than 90%, a total vinyl aromatic content of 15 to 60 wt. %, an aromatic blockiness index (ABI) of 20 to 80%, and a rubbery aliphatic methyl index (RAMI) of 10 to 35. The HSBC is characterized as having, a tan δ peak height of 0.7 to 2, a tan δ peak temperature of −40 to 25° C., a temperature width value (in ° C.) at half the tan δ peak height of 17 to 40, and a temperature difference value (in ° C.) between the tan δ peak temperature and a maximum loss modulus peak temperature of 14 to 21, all measurements by Dynamic Mechanical Analysis (DMA) (10 rad/sec.).

In a second aspect, the polymer block B contains polymerized 1,3-butadiene monomer. The polymerized 1,3-butadiene monomer in the polymer blocks B and C, together, is at least 50 wt. %, based on total weight of the polymer blocks B and C.

In a third aspect, the polymer block B contains polymerized 1,3-butadiene monomer. The polymer blocks B and C, together, contain 40 to 80 wt. % of the polymerized 1,3-butadiene monomer incorporated by 1,2 addition, based on total weight of the polymerized 1,3-butadiene monomer in the polymer blocks B and C.

In a fourth aspect, a multiplication product value (in ° C.) of the value of the tan δ peak height and the temperature width value (in ° C.) at half the tan δ peak height is greater than 25° C.

DRAWINGS

FIG. 1 is an illustration of the DMA (Dynamic Mechanical Analysis) of the nomogram with the tangent Delta (tan δ) and the loss modulus (G") of a hydrogenated styrenic block copolymers.

DESCRIPTION

The following terms will be used throughout the specification.

"At least one of [a group such as A, B, and C]" or "any of [a group such as A, B, and C]" means a single member from the group, more than one member from the group, or a combination of members from the group. For example, at least one of A, B, and C includes, for example, A only, B only, or C only, as well as A and B, A and C, B and C; or A, B, and C, or any other all combinations of A, B, and C. A list of embodiments presented as "A, B, or C" is to be interpreted as including the embodiments, A only, B only, C only, "A or B," "A or C," "B or C," or "A, B, or C".

"At least one X and Y" means there is at least one of X and there is one of Y, such as "X, X, and Y," or "X, X, X, and Y," or "X and Y" only.

"Copolymer" refers to a polymer derived from more than one species of monomer.

"Block copolymer" refers to a copolymer that comprises more than one species of monomer, wherein the monomers are present in blocks. Each block is constituted of a set of monomer units different from the set of monomer of the connected surrounding blocks in the same block copolymer. Each block can be constituted of a homopolymer or a random copolymer.

"Polystyrene content" or PSC of a block copolymer refers to the weight % of vinyl aromatic, e.g., styrene in the block copolymer, calculated by dividing the sum of molecular weights of all vinyl aromatic units by the total molecular weight of the block copolymer. PSC can be determined using any suitable methodology such as proton nuclear magnetic resonance (NMR).

"Molecular weight" or $M_w$ refers to the polystyrene equivalent molecular weight in kg/mol of a polymer block or a block copolymer. $M_w$ can be measured with the gel permeation chromatography (GPC) using polystyrene calibration standards, such as is done according to ASTM 5296-19. The GPC detector can be an ultraviolet or refractive index detector or a combination thereof. The chromatograph is calibrated using commercially available polystyrene molecular weight standards. $M_w$ of polymers measured using GPC are polystyrene equivalent molecular weights or apparent molecular weights, measured at the peak of the GPC trace, and commonly referred to as polystyrene equivalent "peak molecular weight," designated as $M_p$. Individual GPC block $M_w$ can be calculated by the difference of $M_p$ measured before and after the considered block polymerization. For example, $M_w$ of block B is the $M_p$ of species A-B minus the $M_p$ of block A.

"Tangent Delta" or tan delta or tan D or tan δ refers to the ratio between the loss modulus and the elastic modulus. Tan δ is also referred to as damping factor, dissipation factor or loss factor, commonly used as a measure of the damping in a viscoelastic system. Tan δ can be measured by DMA.

"Tan δ maximum" refers to maximum damping factor.

"Aromatic Blockiness Index" or ABI in the (co)polymer refers to the percentage of aromatic units with two adjacent aromatic units in the overall amount of aromatic units present in the polymer. ABI is measured using H-1 NMR spectroscopy of the (co)polymer and is mathematically given by the expression:

$$ABI=100\times(\text{Integral-2/Integral-1}),$$

wherein Integral-1 is determined by integrating the H-1 NMR spectrum from 7.5 ppm to 6.0 ppm and dividing the result by 5; and Integral-2 is determined by integrating the H-1 NMR spectrum of the signal minimum region between 6.9 ppm and 6.6 ppm, to 6.0 ppm, and dividing the result by 2.

"Rubbery Aliphatic Methyl Index" or RAMI in the (co) polymer refers to the percentage of the aliphatic protons (H) present in methyl groups of the conjugated diene derived units with respect to the total aliphatic protons present inside the rubbery units. The total aliphatic protons and the methyl proton content is corrected to remove the contribution of the aliphatic protons from the aromatic units. RAMI is measured using H-1 NMR spectroscopy of the polymer and is mathematically given by the expression:

$$RAMI=100\times(\text{Integral-2}-\text{Correction-2})/(\text{Integral-1}-\text{Correction-1})$$

where Integral-1 is determined by integrating the H-1 NMR spectrum from 2.99 ppm to 0.6 ppm; and Integral-2 is determined by integrating the H-1 NMR spectrum from, the signal minimum region between 1.0 ppm and 0.8 ppm, to 0.6 ppm. The correction is a function of the vinyl aromatic units present in the HSBC and Integral-3. Integral-3 is determined by integrating the H-1 NMR HSBC spectrum from 7.4 ppm to 6.2 ppm. If the vinyl aromatic units are derived from styrene monomer, then Correction-2 is 0, and Correction-1 is defined as: Correction-1=0.6*Integral-3.

The disclosure relates to a hydrogenated styrenic block copolymer (HSBC) with improved mechanical properties, characterized as having a broad tan delta (δ) peak and broad adhesion temperature range, for use in applications including adhesives, protective films, over molding thermoplastic compounds, etc.

(Hydrogenated Styrenic Block Copolymer (HSBC))

The HSBC is formed by hydrogenating a SBC precursor, which is any of linear, branched, or radial block copolymer having at least one end polymer block A, at least one interior polymer block B and/or polymer block C.

In embodiments, the SBC precursor has a general configuration of A-B-C, A-B-C-A, A-B-C-A', A-B-C-B, A-B-C-A-B, A-B-C-B-A, B-A-B-C-B-A, B-A-B-C-B-A-B, C-B-

A-B-C, $(A-B-C)_nX$, $(A-B-C-A)_nX$, $(B-A-B-C)_nX$, $(A-B-C-B-A)_nX$, $(C-B-A-B-C)_nX$, or mixtures thereof; where n is an integer from 2 to 30, and X is a residue of a coupling agent. Polymer blocks A and A' are same or different and based on a vinyl aromatic monomer. Polymer block B is derived from a conjugated diene monomer. Copolymer block C is derived from at least one vinyl aromatic monomer and 1,3-butadiene monomer.

In embodiments, the vinyl aromatic monomer is selected from the group consisting of styrene, para-methylstyrene, para-ethyl styrene, para-n-propylstyrene, para-isopropyl styrene, para-n-butyl styrene, para-sec-butyl styrene, para-isobutyl styrene, para-t-butylstyrene, isomers of para-decylstyrene, isomers of para-dodecyl styrene, ortho-substituted styrene, meta-substituted styrene, alpha-methylstyrene, 1,1-diphenylethylene, and mixtures thereof.

In embodiments, the conjugated diene monomer is selected from the group consisting of isoprene, 1,3-butadiene, 2,3-dimethyl-1,3-butadiene, 1-phenyl-1,3-butadiene, 1,3-pentadiene, 1,3-hexadiene, 3-butyl-1,3-octadiene, farnesene, myrcene, piperylene, cyclohexadiene, and mixtures thereof.

In embodiments, the polymer block B comprises polymerized 1,3-butadiene monomer in an amount of up to 100, 70-100, or 75-98, or 80-95, or >70, or >75, or 80 wt. %, based on total weight of the polymerized conjugated diene monomer in the polymer block B. In embodiments, the polymer block B comprises polymerized conjugated diene monomer other than 1,3-butadiene, from 0-30, or 2-25, or 5-20 wt. %, based on total weight of the polymerized monomer in the block B. In embodiments, the polymer block B is a homopolymer block of 1,3-butadiene monomer.

In embodiments, total polymerized 1,3-butadiene monomer present in polymer blocks B and C, together, is >50, or >55, or >60, or >65, or >70, or >75 wt. %, based on total weight of polymer blocks B and C.

In embodiments, the copolymer block C comprises polymerized 1,3-butadiene monomer from 30-85, or 30-80, or 35-75, or 40-70, or 45-65, or 50-80, or <75 wt. %, based on total weight of the copolymer block C.

In embodiments, the copolymer block C comprises the polymerized vinyl aromatic monomer from 15-70, or 20-60, or 25-50 wt. %, based on total weight of the copolymer block C.

Blocks B and C can have incorporation of 1,3-butadiene monomer by either 1,2 addition and/or 1,4 addition. In embodiments, blocks B and C contain, together, 40-80, or 45-80, or 65-80, or 70-80 wt. % of 1,3-butadiene monomer incorporated by 1,2 addition, based on total weight of polymerized 1,3-butadiene monomer in blocks B and C.

In embodiments, the SBC precursor is hydrogenated to obtain the HSBC, meaning the polymerized vinyl aromatic monomers in polymer blocks A and C are left essentially non-hydrogenated, polymerized conjugated diene units in the polymer block B and polymerized 1,3-butadiene units in the block C are mostly hydrogenated.

In embodiments, the polymerized conjugated diene monomer in the polymer block B and polymerized 1,3-butadiene monomer in the copolymer block C are independently hydrogenated to a level of >70, or >80, or >85, or >90, or >95, or >98, or >99, or >99.9%, based on weight of the polymerized conjugated diene monomer in the polymer block B and the polymerized 1,3-butadiene monomer in the copolymer block C.

In embodiments, the polymerized vinyl aromatic monomer in blocks A and C are independently hydrogenated to a level of <30, or <25, or <20, or <15, or <10, or <5, or <2%, based on weight of the polymerized vinyl aromatic monomer in blocks A and C.

In embodiments, the polymer block A has a $M_p$ of 2-50, or 3-45, or 5-40, or 10-35, or 15-30, or >3, or <35 kg/mol. In embodiments, the polymer block B has a $M_p$ of 10-300, or 15-150, or 20-100, or 25-80, or 30-60, or >15, or <90 kg/mol. In embodiments, the copolymer block C has a $M_p$ of 5-300, or 10-200, or 15-150, or 20-120, or 25-100, or 30-90, or >15, or <160 kg/mol.

In embodiments, the polymer block A constitutes from 5-35, or 10-30, or 5-25, >8, or <40 wt. %; the polymer block B constitutes from 5-35, or 10-30, or 5-25, >8, or <40 wt. % wt. %; and the copolymer block C constitutes from 30-75, or 35-70, or 40-65, or >25, or <60 wt. %, based on total weight of the SBC precursor.

In embodiments, the HSBC has a total vinyl aromatic content (PSC) of 15-60, 20-55, or 25-50, or 30-45 wt. %, based on total weight of the HSBC.

In embodiments, the HSBC has a RAMI of 10-35, or 12-32, or 15-30, or 17-30, or >20, or >25.

In embodiments, the HSBC has an ABI of 20-80%, or 25-75%, or 30-70%, or 35-65%, or 40-60%, or >30%, or >40%, or <75%.

In embodiments, the HSBC further comprises at least one functional group selected from the group consisting of OH, halogen, acid anhydride, amino, epoxy, phosphino, $SO_3Y$, $CO_2Z$, wherein Y is a metal cation, H, alkoxy, or aryloxy. (Methods of Preparation of SBC Precursor)

The SBC precursor can be prepared by known process in the art and disclosed in U.S. Pat. No. 7,449,518, incorporated herein by reference. Typically, the SBC precursor is prepared by an anionic polymerization using a sequential (or successive) polymerization of monomers in solution in the presence of an initiator followed by terminating of polymerized block copolymer chains. The polymerization of monomers can be performed by stepwise addition of the monomer to the solution containing the initiator followed by coupling of the resulting sequential block copolymer chains with a coupling agent (if present) and followed by a hydrogenation step for making the HSBC.

The initiator is generally an organometallic compound, such as organolithium compounds, example, ethyl-, propyl-, isopropyl-, n-butyl-, sec-butyl-, tert-butyl-, phenyl-, hexyl-biphenyl-, hexamethylenedi-, butadieneyl-, isopreneyl-, 1,1-diphenylhexyllithium, or polystyryllithium. The amount of initiator needed is calculated based on the molecular weight to be achieved, generally from 0.002 to 5 wt. %, based on total amount of monomers to be polymerized. A solvent for polymerization can include aliphatic, cycloaliphatic, or aromatic hydrocarbons having 4-12 carbon atoms, e.g., pentane, hexane, heptane, cyclopentane, cyclohexane, methylcyclohexane, decalin, isooctane, benzene, alkylbenzenes, such as toluene, xylene or ethylbenzene, and mixtures thereof.

In embodiments, process conditions for the sequential polymerization step are similar to those in anionic polymerizations, at a temperature of −30 to 150° C., or 10-100° C., or 30-90° C. The polymerization is carried out in an inert atmosphere, e.g., nitrogen, or under pressure at 0.5-65 bars, for <12 hrs., or 5 min.-5 hrs., depending on temperature, concentration of monomer components, molecular weight of the block copolymer, etc.

Examples of the coupling agent include bi- or polyfunctional compounds, for example divinylbenzene, halides of aliphatic or araliphatic hydrocarbons, such as 1,2-dibromoethane, bis(chloromethyl)benzene, or silicon tetrachloride, dialkyl- or diarylsilicon dichloride, alkyl- or arylsilicon trichloride, tin tetrachloride, alkylsilicon methoxides, alkyl silicon ethoxides, polyfunctional aldehydes, such as terephthalic dialdehyde, ketones, esters, anhydrides or epoxides. In embodiments, the coupling agent is selected from methyltrimethoxysilane (MTMS), methyltriethoxysilane (MTES), tetramethoxysilane (TMOS), dimethyladipate, and mixtures thereof.

A suitable amount of the coupling agent can be employed to obtain desired coupling efficiency, e.g., >50%, or >60%, or >70%, or >80%, or >90%.

In embodiments, the SBC precursor is hydrogenated using a hydrogenation process as disclosed in U.S. Pat. Nos. 3,670,054, and 3,700,633, incorporated herein by reference. Any hydrogenation process that is selective for the double bonds in polymerized conjugated diene monomer, leaving the aromatic unsaturation in the polymerized vinyl aromatic monomer substantially intact, can be used.

In embodiments, the hydrogenation process employs a catalyst or catalyst precursor comprising a metal, e.g., nickel, cobalt, or titanium and a suitable reducing agent, e.g., an aluminum alkyl. A sufficient amount of catalyst is used depending on reaction temperature, desired molecular weight of the polymer, etc. The hydrogenation is controlled at a temperature of 25-175° C., or 35-150° C., or 50-100° C., and for a time ranging from 5 min.-8 hrs., or 30 min.-4 hrs. After the hydrogenation is completed, the catalyst and the catalyst residue will be separated from the block copolymer. (Compositions Based on HSBC)

The HSBC can be used in a thermoplastic elastomer composition (TPE) as the primary component, or blended with a polyolefin in a compound, or blended with a rubber in a rubber composition.

In embodiments, a thermoplastic elastomer composition (TPE) is prepared containing a HSBC, optional tackifying resin, optional (other) polymers, optional additives. The HSBC can be added in an amount of 50-99, or 60-90, or 70-95 wt. %, based on the TPE composition total weight.

Examples of other polymers include polylactic acids, polystyrenes, polyethylene glycols, poly(vinyl alcohol), polyurethanes, poly(acrylic acids), poly(acrylamides), polyolefins, polyesters, polyethylene terephthalates, polybutylene terephthalates, poly(butyl succinates), polycarbonates, polyetherimides, polyphenyloxides, poly(methyl methacrylates), poly(n-vinyl-pyrrolidone), polyethylenimenes, poly(dimethyl acrylamide), polyether ketone ketone (PEKK), polytetrafluoroethylene (PTFE), polyamides (PA), polyimides (PI), polyacrylates, poly(dimethylsiloxane), copolymers of foregoing polymers, and mixtures thereof.

Examples of tackifying resins include one or more natural or modified rosins or rosin esters containing those made using polyols, polyterpene resins, phenolic-modified terpene resins, aromatic resins, aliphatic petroleum resins such as those made using C5 or C9 hydrocarbon streams obtained from petroleum cracking/refining, hydrogenated forms thereof, or mixtures thereof. In embodiments, the tackifying resin is used in amounts of 1-50, or 10-40, or 5-30 wt. %, based on the TPE composition total weight.

In embodiments, the HSBC is blended with polyolefin selected from the group consisting of polyethylene (PE), polypropylene (PP), polybutylene (PB), polyisobutylene, ethylene propylene rubber, polyvinylchloride (PVC), polydiene, such as polybutadiene (e.g., poly-1,3-butadiene or poly-1,2-butadiene), polyisoprene, polydicyclopentadiene (PDCPD), polymers of ethylidene norbornene or vinyl norbornene, EPDM rubber, low density polyethylene (LDPE), linear low density polyethylene (LLDPE), very low density polyethylene (VLDPE), high density polyethylene (HDPE), medium density polyethylene (MDPE), high molecular weight polyethylene (HMWPE), and ultra-high molecular weight polyethylene (UHMWPE), polyolefin elastomer (POE), and mixtures thereof. In embodiments, a weight ratio of the HSBC to the polyolefin is from 1:10-10:1, or 7:3 to 3:7, or 2:3 to 3:2.

In embodiments, the HSBC is blended with one or more rubbers, selected from a natural rubber, a synthetic rubber, and mixtures thereof. Examples of rubbers include natural rubber (NR), ethylene-propylene-diene rubber (EPDM), ethylene/alpha-olefin rubbers (EPR), ethylene-vinyl acetate (EVA), styrene/butadiene rubber (SBR), acrylonitrile/butadiene rubber (NBR), polychloroprene rubbers, polybutadiene rubbers (BR), synthetic polyisoprene rubber (IR), isobutylene-isoprene rubber (IIR), and mixtures thereof. In embodiments, a rubber composition is prepared comprising 50-99 wt. % of the HSBC, 1-50 wt. % of the rubber, and 0-15 wt. % of additives, based on total weight of the rubber composition.

In embodiments, optional additive is selected from the group consisting of activators, curing agents, neutralizing agents, thickeners, coalescing agents, slip agents, release agents, antimicrobial agents, surfactants, antioxidants, antiozonants, color change pH indicators, plasticizers, tackifiers, film forming additives, dyes, pigments, cross-linking agents, UV absorbers, UV stabilizers, catalysts, fillers, redox couples, fibers, flame retardants, viscosity modifiers, wetting agents, deaerators, toughening agents, adhesion promoters, colorants, heat stabilizers, lubricants, flow modifiers, drip retardants, antistatic agents, processing aids, stress-relief additives, accelerator, water resistant agents, water-proofing agents, hydrophilicity-imparting agents, electrical conductivity-imparting agents, thermal conductivity-imparting agents, electromagnetic wave shielding property-imparting agents, fluorescent agents, sliding property-imparting agents, foaming agents, and mixtures thereof.

Examples of plasticizers include paraffinic oil, naphthenic oil, natural oil, hydrotreated naphthenic oil, low molecular weight polyolefin, low molecular weight liquid rubber, and mixtures thereof.

Fillers can be selected from inorganic silicates such as andalusite, sillimanite, kyanite, mullite, pyrophyllite, allophane, mineral calcium silicate, silica, quartz powder, metal sulfates such as barium sulfate, metal oxides such as zinc oxide, titanium dioxide, zeolites, leucite, potash feldspar, biotite, gypsum, anhydrite or heavy spar, and calcium minerals such as talc or chalk (CaCO3), metal hydroxides, mica, magnesium hydroxide, aluminum hydroxide, and mixtures thereof.

In embodiments, the additive used is from 0-15, or 5-15, or 1-10, or 0.5-5 wt. %, based on total weight of the composition containing the HSBC.

Compositions based on HSBCs can be prepared by mixing components described above using a suitable processing device, such as Henschel mixer, V blender, ribbon blender, single or twin screw extruder, kneader and the like. Thereafter, the compositions can be pelletized for further processing or for end-use applications. In other embodiments, the compositions containing the HSBC are processed directly into end-use applications using conventional plastics processing equipment, e.g., extrusion, molding including compression molding, injection molding, gas-assisted injection molding, hollow molding, sheet forming, rotational molding, laminating, calendering, vacuum forming, thermoforming, or hot forming.

(Properties of HSBC)

The HSBC provides improved mechanical and thermal properties which make them suitable for use in high performance applications. The HSBC can be processed with or without a curing agent. The HSBC shows improved adhesion and high damping performance at a broad temperature range while maintaining good balance of mechanical properties.

In embodiments, the HSBC when used as an adhesive layer allows easy peel-off with adhesive failure property, when the adhesive layer is peeled from the surface. The HSBC is particularly suitable for use a component of protective film, providing easy peelability from the protected surfaces even after long storage time (e.g., 1 day, 1 week, 1 month, 3 months, or more) or during transport and under various environmental conditions.

In embodiments, the HSBC has a tensile strength of 10-60, or 15-55, or 18-50, or 20-45, or 22-40, or 25-38, >15, or >20 MPa, measured according to ASTM D412.

In embodiments, the HSBC has a tan δ peak temperature of −40 to 25° C., or −35 to 20° C., or −30 to 15° C., or −25 to −10° C., or −5 to 25° C., measured by DMA (10 rad/sec.).

In embodiments, the HSBC has a value of a tan δ peak height of 0.7-2, or 0.9-1.95, or 1-1.9, or 1.05-1.85, or 1.1-1.8, or 1.15-1.75, or 1.2-1.7, or >0.9, or >1, or >1.1, or >1.2.

In embodiments, the HSBC has a 'full width half maximum' (FWHM), or a temperature width value (in ° C.) at half the tan δ peak height of 15-40, or 18-35, or 17-32, or 22-40, or 20-30, or >22, or >24.

In embodiments, the HSBC has a maximum loss modulus peak temperature of −55° C. to −25° C., or −43° C. to −30° C., or −45° C. to −35° C., or −40° C. to −30° C. The maximum loss modulus G″ obtained as a function of temperature, attains a peak value ("loss modulus G" peak temperature) at a sweep frequency of 10 rad/s.

In embodiments, the HSBC has a temperature difference value (in ° C.) between the tan δ peak temperature and a maximum loss modulus peak temperature of 14-21, or 13.5-20.5, or 13-20, or 12.5-19.5, or 12-19, or 11.5-18.5.

In embodiments, the HSBC has a multiplication product value (in ° C.) of the value of tan δ peak height and the temperature width value (° C.) at half the tan δ peak height of >25, or >27, or >28, or >30, or >32, or >35, or >38, or >40 or 25-50, or 22-45, or 24-42.

In embodiments, the HSBC has a melt flow rate (MFR) of 1-200, or 2-100, or 5-80, or 10-60, or 15-50, or 20-40, or 10-20 dg/min, measured according to D1238 under 2.16 kg load and at 230° C.

(Applications)

HSBCs can be used in applications, e.g., vibration damping, adhesives, labels, sealants, seals, acoustics, communications, coatings, e.g., wall coating or metal coatings, shoe parts, wire and cables. Adhesives can be pressure-sensitive and holt-melt adhesives.

In embodiments, HSBCs are used for producing molded articles, e.g., automotive parts (automotive interior materials and automotive exterior materials), various containers such as food packaging containers, consumer electrical appliances, medical device parts, industrial parts, toys, and tackiness films, for example, surface protection films for protecting surfaces, such as glass, wood, metal, polymer, ceramic, and the like, for use in wide application areas including electronics, household items, furniture, displays, touch screens, and the like.

In embodiments, a protection film (or an adhesive film) comprises the HSBC, having a thickness of 1-200 μm, or 5-100 μm, or 10-50 μm, or 5-30 μm and thickness of the substrate film can be from 10 μm-5 mm, or 50 μm-2 mm, or 100 μm-1 mm, or 30 μm-200 μm. The protection film can be prepared by known methods, e.g., casting, extruding, cast film extrusion, blown film extrusion, and the like, and can have a substrate film, e.g., polyethylene, polypropylene, polyesters, polyamides, polyimides, polyphenylene oxides, etc.

The HSBC can be used for vibration or sound damping applications, e.g., energy absorption, for both outdoor and indoor applications, at broad service temperature ranges, e.g., −50° C. to 100° C., or −30° C. to +80° C., or −10° C. to 50° C., or 0° C. to 100° C.

In embodiments, an asphalt composition comprising 0.5-50 parts by weight of the HSBC, based on 100 parts by weight of an asphalt (or bitumen). The asphalt composition can be used in a roof shingle.

EXAMPLES

The following examples are intended to be non-limiting.

Polymer molecular weights were determined by gel permeation chromatography (GPC) using polystyrene calibration standards according to ASTM 5296.

Glass transition temperature ($T_g$) of all polymer samples were measured by DMA according to ASTM 4065. Temperature sweep experiments were conducted from −80 to 200° C. with a heating ramp of 2° C./min and at 10 rad/s in the shear mode unless specified otherwise, where storage moduli (G'), loss moduli (G") and loss factors (tan δ) were obtained as a function of temperature. The tan δ peak temperature here is considered to be the $T_g$ of the rubber phase. DMA data at 10 rad/s or at 1 Hz are not differing a lot but provided ranges are specified on 10 rad/s in shear mode measurements.

The damping performance as a function of the breadth of the temperature range was measured using DMA. In one method, the temperature difference value (in ° C.) between the temperature at which the tan δ attains a peak value ("peak tanDelta" temperature) and the temperature at which the loss modulus G" attains a peak value ("loss modulus G" peak temperature) at a sweep frequency of 10 rad/s was determined. A larger temperature difference signifies a broader tan δ peak and a damping performance that was closer to the damping factor measured at the peak tan δ value. In another method, tan δ peak width was assessed by its total width at half its maximum height.

Sample specimens of the HSBC were prepared using two different methods. In the first method, samples were prepared by pressing under high pressure at 180° C. into 2 mm (thickness) plates. In the second method, film samples were cast from a solution of 10 wt. % polymer dissolved in toluene at room temperature. The resulting cast films were subsequently dried in a vacuum oven at 40° C.

Tensile stress-strain was measured according to ASTM D412. Hardness shore A was measured according to ASTM D2240. Unless otherwise specified, all reported melt flow rates (MFR) were measured according to D1238 under 2.16 kg load and at 230° C.

The components used in examples include:

HSBC-C1 is a hydrogenated styrenic block copolymer with a structure A-C-A'. The polymer block A is of styrene containing a $M_p$ of about 6.4 kg/mol. The copolymer block C is of styrene and 1,3-butadiene having a $M_p$ of about 135 kg/mol. The PSC is of 32.4 wt. %.

HSBC-C2 is a hydrogenated styrenic block copolymer with a structure $(A-C)_nX$. The block A is a polymer block of styrene having a $M_p$ of about 7.3 kg/mol. The copolymer block C is of styrene and 1,3-butadiene having a $M_p$ of about 55 kg/mol. The coupling efficiency is 95%, and PSC is 33.8 wt. %.

Low density polyethylene (LDPE) is used as core layer and backing layer.

Random copolymer of propylene-ethylene block (RcPP) copolymer is used as core layer and backing layer.

Example 1—Preparation of HSBC

Cyclohexane (593 kg) was added to a stainless steel reactor. To this, 2.7 kg of sec-BuLi catalyst was added followed by 40.5 kg first styrene monomer addition over 7 min. After 43 min. and after reaching peak reaction temperature to 45° C., a sample was taken to confirm the formation of the first styrene polymer block. Into the reaction mixture, 0.82 kg of 1,2-diethoxypropane was added followed by 193.5 kg first 1,3-butadiene addition over a period of 68 min. The reaction was maintained between 46-51° C. for 40 minutes. Formation of butadiene polymer block was confirmed by analyzing the sample at this stage of the reaction. Further to the reaction mixture, 37 kg of second styrene addition was done over 12 min., while continuing the addition of the first 1,3-butadiene. After 84 min. from the start of addition of first 1,3-butadiene, another 1.4 kg amount of a second butadiene addition was done to the reaction mixture. 0.33 kg of a methyltrimethoxysilane (MTMS) was added to the reaction mixture. After around 45 min., 18 g of methanol was added and a sample of the reaction mixture was collected to confirm the formation of the SBC precursor. Hydrogenation of the SBC precursor was carried in the presence of cobalt catalyst until the conversion of the polymerized 1,3 butadiene units to a hydrogenation level of >98 mol. %. The cobalt catalyst was removed from the reaction mixture and the block copolymer solution was treated with a Ionox 1330 stabilizer. The block copolymer solution was steam coagulated followed by drying to obtain the HSBC.

Examples 2-4

Procedure of example 1 was repeated except amounts of reactants and minor changes in reaction conditions. Details of amounts of reactants and reaction conditions are provided in table 1.

TABLE 1

|  | Example-1 | Example-2 | Example-3 | Example-4 |
|---|---|---|---|---|
| Sec-BuLi (kg) | 2.7 | 1.1 | 2.8 | 2.7 |
| First styrene addition (kg) | 40.5 | 17.4 | 40.5 | 40.4 |
| Peak Reaction temperature (° C.) | 45 | 35 | 46 | 44 |
| Diethoxypropane (kg) | 0.82 | 0.65 | 0.7 | 0.7 |
| First butadiene addition (kg) | 193.5 | 136.4 | 193.7 | 195.7 |
| Second styrene addition (kg) | 37 | 28 | 37 | 37 |
| Second butadiene addition (kg) | 1.4 | — | 2.3 | 2.3 |
| Coupling agent (kg) | 0.33 | — | 0.34 | 0.33 |
| Third styrene addition (kg) | — | 9.6 | — | — |
| Reaction time (min) | 45 | 7 | 30 | 30 |
| Methanol (g) | 18 | 74 | 30 | 30 |

Tables 2 and 3 compare structure and properties of HSBCs prepared in Examples 1-4 with HSBC-C1 and HSBC-C2:

TABLE 2

| | HSBC-C1 | HSBC-C2 | Example-1 | Example-2 | Example-3 | Example-4 |
|---|---|---|---|---|---|---|
| HSBC structure | A-C-A' | $(A-C)_nX$ | $(A-B-C)_nX$ | A-B-C-A' | $(A-B-C)_nX$ | $(A-B-C)_nX$ |
| Block A ($M_p$) | A = 6.4, | 7.3 | 7.6 | A = 8.0, | 7.7 | 7.7 |
| Block A' ($\Delta M_p$ in Kg/mol) | A' = 8.0 | | | A' = 5.5 | | |
| Block B ($\Delta M_p$ in Kg/mol) | Block B absent | Block B absent | B = 34.5* | B = 32.9* | B = 33.7* | B = 33.7* |
| Block C ($\Delta M_p$ in Kg/mol) | C = ~135 | C = ~55 | C = 38.2* | C = 102.5* | C = 41.4* | C = 42.6* |
| HSBC structure with n value | A-C-A' | $(A-C)_2X$ | $(A-B-C)_2X$ | A-B-C-A' | $(A-B-C)_2X$ | $(A-B-C)_2X$ |
| HSBC Mp (in Kg/mol) | 148.9 | 125 | 145.9 | 133.2 | 153.3 | 155.0 |
| Coupling efficiency (%) | — | 92 | 91.5 | — | 92.0 | 81.0 |
| PSC (wt. %) | 32.4 | 33.8 | 29 | 27.1 | 29 | 29 |
| RAMI (%) | 27.3 | 27 | 26.9 | 26.9 | 25.4 | 25.4 |
| ABI (%) | 42 | 51 | 51.8 | 49 | 51.2 | 51.1 |

$\Delta M_p$ is a difference between two Mps for two different peaks, e.g., Mp1 − Mp2.

*Measured before hydrogenation

TABLE 3

| | HSBC-C1 | HSBC-C2 | Example-1 | Example-2 | Example-3 | Example-4 |
|---|---|---|---|---|---|---|
| [1]Tan δ PT (° C.) | −17.7 | −5.7 | −17.5 | −18.9 | −21 | −19.8 |
| [2]Max. loss mod. PT (° C.) | −26.9 | −32.3 | −34.0 | −35.2 | −39.3 | −39.8 |
| [3]TD tan δ PT & max. loss mod. PT (° C.) | 9.2 | 26.6 | 16.5 | 16.3 | 18.3 | 20.0 |
| Value of Tan δ peak height | 1.96 | 1.16 | 1.25 | 1.55 | 1.21 | 0.81 |
| [4]MultiProd tan δ PH & FWHM (° C.) | 32.5 | 29.0 | 33.4 | 33.9 | 30.3 | 30.1 |
| [5]TW at half tan δ PH (° C.) | 16.6 | 25 | 26.7 | 21.9 | 25 | 37.2 |
| ODT (° C.) | 225 | 170-210 | 200 | 190 | 220 | 215 |
| MFR at 230° C./2.16 kg (g/10 min) | 12 | 48 | 18 | 34 | 10/9.5 | 14/15.5 |
| Hardness (ShoreA)** | 45 | 46 | 42 | 45 | 45 | 46 |

**Measured on 3 × 2 mm injected plate stacked together with 10 s dwell time.

[1]Tan δ PT (° C.): tan δ peak temperature;

[2]Max. loss mod. PT (° C.): maximum loss modulus peak temperature (° C.);

[3]TD tan δ PT & max. loss mod. PT (° C.): temperature difference value (in ° C.) between tan δ peak temperature and maximum loss modulus peak temperature (° C.);

[4]MultiProd tan δ PH & FWHM (° C.): a multiplication product value (in ° C.) of the tan δ peak height and the full width half maximum (° C.); and

[5]TW at half tan δ PH (° C.): The temperature width value (in ° C.) at half the tan δ peak height.

Examples 5

Protective films containing the HSBC were prepared, and peel adhesion (PA) properties were evaluated. Protective film (or adhesive film/layer) samples were prepared using a three layers coextrusion process. The top layer was the HSBC or the composition containing the HSBC, while the two other layers were polyolefinic backing layers of polypropylene and/or polyethylene. The melt temperatures were adapted in the range of 190-250° C. to reach a smooth extrusion with about 10 μm adhesive layer and 2 layers of about 20 μm each of polyolefin as backing layers. The extruded film was allowed to cool down before to be wrap onto itself with the adhesive layer oriented to the center to form a roll of protective film. Film thicknesses of different protective films are provided in table 4.

Peel adhesion (PA)(180°) was measured on stainless steel or PMMA plates according to FTM1 (peel adhesion (180°) test equipment). FTM1 test method was used to quantify performance of adhesion or peelability of self-adhesive pressure sensitive materials. Peel adhesion is defined as the force required to remove pressure sensitive coated material, which has been applied to a standard test plate under specified conditions from the plate at a specified angle and speed. Adhesion was measured 20 minutes and 24 hours after application, the latter being considered as the ultimate adhesion.

To evaluate the PA build up, PA tests were conducted after 20 minutes at room temperature contact time between the protective film and the substrate, and after various ageing steps. Plates protected by the protective film were submitted to one of the following two ageing before to be cooled down to room temperature to perform their PA testing. The first ageing procedure maintained the protected plates at 75° C. for 7 days before cooling, while the second ageing procedure maintained the protected plates at 80° C. for 2 hours before cooling to room temperature and PA testing. The thickness of each adhesive HSBC layer was about 6-11 μm. LDPE backing layers were used for supporting adhesive HSBC layers, having total thickness of the backing layer and the adhesive HSBC layer was about 40-50 μm.

Table 4 compares test results, including PA of protective films prepared from the HSBC of examples 1-4, and HSBC-C1 and HSBC-C2.

TABLE 4

| | HSBC-C1 | HSBC-C2 | Example-1 | Example-2 | Example-3 | Example-4 |
|---|---|---|---|---|---|---|
| [a]TH HSBC AL (µm) | 9.45 | 9.4 | 8.9 | 6 | 9.3 | 8.6 |
| [b]TTH: HSBC AL + LDPE CL + LDPE BL (µm) | 48 | 41 | 45 | 43 | 49 | 49 |
| | | PA to stainless steel | | | | |
| Initial PA (20 min. at 25° C.) (N/25 mm) | 1.25 | 1.81 | 2.6 | 1.83 | 1.93 | 2.04 |
| PA after 7 days at 75° C. (N/25 mm) | 3.71 | 3.71 | 4.23 | 3.83 | 4.07 | 4.09 |
| Increase in % of initial PA (7 days) | 197 | 105 | 63 | 109 | 111 | 100 |
| PA after 2 hours at 80° C. (N/25 mm) | 2.07 | 3.11 | 3.0 | 2.77 | 2.62 | 2.60 |
| Increase in % of initial PA (2 hours) | 65 | 72 | 15 | 51 | 36 | 27 |
| | | PA to PMMA | | | | |
| Initial PA (20 min at 25° C.) (N/25 mm) | 1.83 | 2.38 | 3.25 | 2.3 | 2.35 | 2.8 |
| PA after 7 days at 75° C. (N/25 mm) | 5.67 | 4.45 (Cohesive failure) | 7.4 | 6.07 | 5.42 | 6.03 |
| Increase in % of initial PA (7 days) | 210 | — | 128 | 164 | 131 | 115 |
| PA after 2 hours at 80° C. (N/25 mm) | 5.06 | 4.99 | 5.47 | 5.43 | 5.28 | 5.09 |
| Increase in % of initial PA (2 hours) | 176 | 110 | 68 | 136 | 125 | 82 |

[a]TH HSBC AL (µm): thickness of HSBC adhesive layer (µm); and

[b]TTH: HSBC AL + LDPE CL + LDPE BL (µm): Total film thickness of HSBC adhesive layer + core layer (LDPE) + backing layer (LDPE) (µm).

As shown in table 4, increase in % of peel adhesion (PA) after 7 days at 75° C. or after 2 hours at 80° C., of Examples 2-4, is smaller and better when compared with HSBC-C1 and HSBC-C2 examples, for both stainless steel (SUS) and PMMA plates. These results indicate that the minimum adhesion build up is resulted with ageing time and temperature. HSBC-C2 leads to the problematic cohesive failure after the 75° C. ageing.

Examples 6-9

Protective film samples were prepared as described in above procedures but for the adhesive layer, extruder was fed with a dry mixture of the HSBC (example 3) with various amount of random copolymer PP (94% propylene and 6% ethylene) characterized by a MFR of 5 g/10 min. The backing layer was the pure random copolymer PP. PA 180° was measured on Light Guide Plates protected by the protective films, which were submitted to one of the following two ageing before to be cooled down to room temperature to perform their PA testing. The first ageing procedure maintained the protected plates at 80° C. for 2 hrs. under 5 kg pressure before cooling while the second ageing procedure maintained the protected plates at 110° C. for 2 hrs. under 5 kg pressure before cooling to room temperature and PA testing. For transparency tests, 2 mm plaques of the HSBC/PP blend were prepared.

Table 5 shows transparency and PA values measured on protective film using the HSBC/random copolymer PP mixture as an adhesive layer.

TABLE 5

| | Example-6 (0% PP) | Example-7 (10% PP) | Example-8 (20% PP) | Example-9 (30% PP) |
|---|---|---|---|---|
| Total transmittance (%) | 85.1 | 79.1 | 76 | 74.2 |
| Haze (%) | 6.27 | 15.6 | 23 | 30.5 |
| Clarity (% | 93.4 | 90.8 | 88.7 | 87.2 |
| Hardness, Shore A, 10 s | 44.3 | 58.7 | 69.2 | 82.6 |
| | Protective film PA to Light Guide Plate | | | |
| [c]TH HSBC/PP AL (µm) | 10.6 | 10.1 | 10.0 | 8.5 |
| [d]TTH: HSBC/PP AL + | 47.5 | 51.7 | 51.4 | 44.3 |

TABLE 5-continued

| | Example-6 (0% PP) | Example-7 (10% PP) | Example-8 (20% PP) | Example-9 (30% PP) |
|---|---|---|---|---|
| RcPP CL + RcPP BL (µm) | | | | |
| Initial PA, 20 min. at 25° C. (N/25 mm) | 1.51 | 1.31 | 0.58 | 0.20 |
| PA after 2 hours at 80° C., 5 kg (N/25 mm) | 1.36 | 0.96 | 0.81 | 0.51 |
| Increase in % of initial PA (2 hours) | −10% | −27% | 39% | 153% |
| PA after 2 hours at 110° C., 5 kg (N/25 mm) | 2.36 | 2.24 | 2.38 | 2.04 |
| Increase in % of initial PA (2 hours) | 56% | 71% | 312% | 918% |

[c]TH HSBC/PP AL (µm): thickness of HSBC/PP adhesive layer (µm); and

[d]TTH: HSBC/PP AL + RcPP CL + RcPP BL (µm): Total film thickness of HSBC/PP adhesive layer + core layer (random copolymer of PP) + backing layer (random copolymer of PP) (µm).

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

Unless otherwise specified, all technical and scientific terms used herein have the same meanings as commonly understood by one of skill in the art to which the disclosed disclosure belongs. the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A hydrogenated styrenic block copolymer comprising: at least one polymer block A, at least polymer block B, and at least one copolymer block C;
   wherein prior to hydrogenation,
      each polymer block A is derived from a vinyl aromatic monomer,
      each polymer block B is derived from a conjugated diene monomer selected from the group consisting of isoprene, 1,3-butadiene, 2,3-dimethyl-1,3-butadiene, 1-phenyl-1,3-butadiene, 1,3-pentadiene, 1,3-hexadiene, 3-butyl-1,3-octadiene, farnesene, myrcene, piperylene, cyclohexadiene, and mixtures thereof, and
      each copolymer block C is derived from at least one vinyl aromatic monomer and 1,3-butadiene monomer;
   wherein after hydrogenation, the hydrogenated styrenic block copolymer has:
      a hydrogenation level in the polymerized conjugated diene monomer in the polymer block B of greater than 90%;
      a hydrogenation level in the polymerized 1,3-butadiene monomer in the polymer block C of greater than 90%;
      a total vinyl aromatic content of 15 to 60 wt. %;
      an aromatic blockiness index (ABI) of 20 to 80%; and
      a rubbery aliphatic methyl index (RAMI) of 10 to 35;
   wherein the hydrogenated styrenic block copolymer is characterized as having:
      a tan δ peak height of 0.7 to 2;
      a tan δ peak temperature of −40 to 25° C.;
      a temperature width value (in ° C.) at half the tan δ peak height of 17 to 40; and
      a temperature difference value (in ° C.) between the tan δ peak temperature and a maximum loss modulus peak temperature of 14 to 21, all measurements by Dynamic Mechanical Analysis (DMA) (10 rad/sec.).

2. The hydrogenated styrenic block copolymer of claim 1, wherein the polymer block B contains polymerized 1,3-butadiene monomer, and wherein the polymerized 1,3-butadiene monomer in the polymer blocks B and C, together, is at least 50 wt. %, based on total weight of the polymer blocks B and C.

3. The hydrogenated styrenic block copolymer of claim 1, wherein the polymer block B contains polymerized 1,3-butadiene monomer, and wherein the polymer blocks B and C, together, contain 40 to 80 wt. % of the polymerized 1,3-butadiene monomer incorporated by 1,2 addition, based on total weight of the polymerized 1,3-butadiene monomer in the polymer blocks B and C.

4. The hydrogenated styrenic block copolymer of claim 1, wherein a multiplication product value (in ° C.) of the value of the tan δ peak height and the temperature width value (in ° C.) at half the tan δ peak height is greater than 25° C.

5. The hydrogenated styrenic block copolymer of claim 1, wherein the tan δ peak height is greater than 0.9 and the temperature width value (in ° C.) at half the tan δ peak height is greater than 22° C.

6. The hydrogenated styrenic block copolymer of claim 1, wherein the hydrogenated styrenic block copolymer has a maximum loss modulus peak temperature of −55° C. to −25° C.

7. The hydrogenated styrenic block copolymer of claim 1, wherein the hydrogenated styrenic block copolymer has an aromatic blockiness index (ABI) of 25 to 75%.

8. The hydrogenated styrenic block copolymer of claim 1, wherein the hydrogenated styrenic block copolymer has a rubbery aliphatic methyl index (RAMI) of 12 to 32.

9. The hydrogenated styrenic block copolymer of claim 1, wherein the hydrogenated styrenic block copolymer is obtained by hydrogenation of a styrenic block copolymer precursor having a general configuration of A-B-C, A-B-C-A, A-B-C-A', A-B-C-B, A-B-C-A-B, A-B-C-B-A, B-A-B-C-B-A, B-A-B-C-B-A-B, C-B-A-B-C, (A-B-C)$_n$X, (A-B-C-A)$_n$X, (B-A-B-C)$_n$X, (A-B-C-B-A)$_n$X, (C-B-A-B-C)$_n$X, or mixtures thereof, wherein n is an positive integer, X is a residue of a coupling agent; wherein
   each polymer block A and A' independently comprise the vinyl aromatic monomer selected from the group consisting of styrene, para-methylstyrene, para-ethylstyrene, para-n-propylstyrene, para-iso-propylstyrene, para-n-butylstyrene, para-sec-butyl styrene, para-iso-butyl styrene, para-t-butyl styrene, isomers of para-decylstyrene, isomers of para-dodecylstyrene, ortho-substituted styrene, meta-substituted styrene, alpha-methyl styrene, 1,1-diphenylethylene, 1,2-diphenylethylene, and mixtures thereof;
   each polymer block B comprises the conjugated diene monomer selected from the group consisting of isoprene, 1,3-butadiene, 2,3-dimethyl-1,3-butadiene, 1-phenyl-1,3-butadiene, 1,3-pentadiene, 1,3-hexadiene, 3-butyl-1,3-octadiene, farnesene, myrcene, piperylene, cyclohexadiene, and mixtures thereof; and
   each copolymer block C comprises styrene and 1,3-butadiene monomer.

10. The hydrogenated styrenic block copolymer of claim 1, wherein the polymerized conjugated diene monomer in the polymer block B and the polymerized 1,3-butadiene monomer in the polymer block C are independently hydrogenated to a level of greater than 95%.

11. The hydrogenated styrenic block copolymer of claim 1, wherein the polymerized vinyl aromatic monomer in polymer blocks A and C are independently hydrogenated to a level of less than 30%.

12. The hydrogenated styrenic block copolymer of claim 1, wherein the polymer block A constitutes from 5 to 35 wt. %, the polymer block B constitutes from 5 to 35 wt. %, and the polymer block C constitutes from 30 to 75 wt. %, based on total weight of the hydrogenated styrenic block copolymer.

13. The hydrogenated styrenic block copolymer of claim 1, wherein the hydrogenated styrenic block copolymer has a vinyl aromatic content (PSC) of 20 to 55 wt. %, based on total weight of the hydrogenated styrenic block copolymer.

14. The hydrogenated styrenic block copolymer of claim 1, wherein the polymer block C comprises polymerized 1,3-butadiene monomer from 30 to 85 wt. %, based on total weight of the polymer block C.

15. The hydrogenated styrenic block copolymer of claim 1, wherein the hydrogenated styrenic block copolymer has a tensile strength of 10 to 60 MPa, measured according to ASTM D412.

16. The hydrogenated styrenic block copolymer of claim 1, wherein the hydrogenated styrenic block copolymer has a melt flow rate (MFR) of 1 to 200 dg/min., measured according to D1238 under 2.16 kg load and at 230° C.

17. A thermoplastic elastomer composition comprising:

50 to 99 wt. % of the hydrogenated styrenic block copolymer of claim 1;

1 to 50 wt. % of a tackifying resin; and 0 to 15 wt. % of at least one additive, based on total weight of the thermoplastic elastomer composition.

18. A rubber composition comprising:

50 to 99 wt. % of the hydrogenated styrenic block copolymer of claim 1;

1 to 50 wt. % of a rubber; and 0 to 15 wt. % of at least one additive, based on the total weight of the rubber composition.

19. An asphalt composition comprising 0.5 to 50 parts by weight of the hydrogenated styrenic block copolymer of claim 1, based on 100 parts by weight of an asphalt.

20. An adhesive film comprising the hydrogenated styrenic block copolymer of claim 1, where the adhesive film has a thickness of 1 to 200 μm.

\* \* \* \* \*